United States Patent [19]
Karlow et al.

[11] Patent Number: 5,553,887
[45] Date of Patent: Sep. 10, 1996

[54] INFLATABLE RESTRAINT MODULAR HOUSING WITH DEPLOYMENT DIRECTING FEATURE

[75] Inventors: James P. Karlow, Milford; Mohamed Boumarafi, Rochester Hills; Jonathan Hurford, Lake Orion, all of Mich.

[73] Assignee: Takata Inc., Auburn Hills, Mich.

[21] Appl. No.: 536,962

[22] Filed: Sep. 29, 1995

[51] Int. Cl.⁶ .................................................. B60R 21/22
[52] U.S. Cl. ..................... 280/730.2; 280/728.3
[58] Field of Search ............................ 280/728.3, 730.2, 280/733, 730.1, 741, 728.1, 728.2; 206/5, 6

[56] References Cited

U.S. PATENT DOCUMENTS

| 2,184,408 | 12/1939 | Bouchard | 206/6 |
| 5,474,324 | 12/1995 | Bentley et al. | 280/732 |

FOREIGN PATENT DOCUMENTS 2281259  1/1995  United Kingdom.

*Primary Examiner*—Eric D. Culbreth
*Assistant Examiner*—Paul N. Dickson
*Attorney, Agent, or Firm*—Harness, Dickey & Pierce PLC

[57] ABSTRACT

An inflatable restraint housing for enclosing an air cushion assembly and securing the assembly within a vehicle is provided. The one-piece housing is formed of thermoplastic material and includes an inboard and outboard half hingedly secured together and enclosing the air cushion assembly in a tapered interior chamber. The housing is generally cylindrical having an inboard and outboard directing ramp formed on the respective inner surfaces of each half to define a tapering elliptical cross-section which focuses the energy generated by the inflation of the air cushion allowing the air cushion to rapidly emerge from the housing. The tapered interior chamber of housing also directs the air cushion into the desired position within the vehicle interior during deployment.

19 Claims, 4 Drawing Sheets

INFLATABLE RESTRAINT MODULAR HOUSING WITH DEPLOYMENT DIRECTING FEATURE

BACKGROUND AND SUMMARY OF THE INVENTION

This invention relates to an automotive safety device and more particularly to a housing for an inflatable restraint module which provides rapid emergence and proper positional placement of an air cushion in a vehicle to provide occupant protection during frontal or side impact.

Inflatable restraint systems have achieved widespread use in vehicles today. These systems incorporate a crash sensor which detects the onset of a vehicle collision and sends a triggering signal to the inflatable restraint module. A source of gas is activated in response to the triggering signal to inflate a fabric air cushion which is deployed into the vehicle interior to absorb impact energy of the occupant within the vehicle. Such inflatable restraint systems are most commonly found mounted to steering wheels for driver-side protection, or mounted to instrument panel structure to provide protection for front seat passengers. While these systems have been found to provide excellent occupant crash protection particularly when used in combination with a belt-type restraint system, efforts continue to further improve the operation of these devices.

Similarly, there has been increased emphasis in designing inflatable restraint systems for side impact protection. Statistically, side impact collisions are more likely to cause significant injury or death as compared with frontal impacts with equivalent impact energy. This is in part attributable to the limited amount of vehicle structure between the occupant and the outside body structure subject to side impact collisions. Accordingly, it is believed that inflatable restraints for side impact collisions can provide benefits similar to those realized for frontal impacts.

Thus, there is a continuing need to improve the manufacturability, cost, performance, and reliability of these systems. The success of inflatable restraints for side or frontal impact protection is dependent upon getting the air cushion in the proper location as rapidly as possible. Previously, this has been accomplished by incorporating bag tethers for forming the air cushion into a desired shape when inflated. However, bag tethers increase the complexity and cost of the inflatable restraint system. In addition, these systems have relied upon the configuration of the vehicle interior to direct the air cushion into the proper location, thereby requiring the use of a more powerful inflator.

In accordance with the present invention, a housing for an inflatable restraint module is provided which is particularly adapted for side impact protection applications, but may also be implemented in other applications such as front seat passenger-side applications. The module includes a one-piece hinged housing secured to a vehicle frame member, for example a seat back frame member, an air cushion and an inflator assembly. An air cushion deployment directing ramp is incorporated into the inner surface of the housing for directing the momentum of the air cushion in a desired direction as it is deployed. Furthermore, the edge of the housing from which the air cushion is deployed is formed to cooperate with the deployment directing ramp and the end portions of the housing to properly position the air cushion between the occupant and the vehicle interior. These deployment directing features facilitate rapid emergence and proper direction and placement of the inflating air cushion by focusing the energy of the expanding air cushion towards the forward portion of the housing to deploy the air cushion therefrom.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
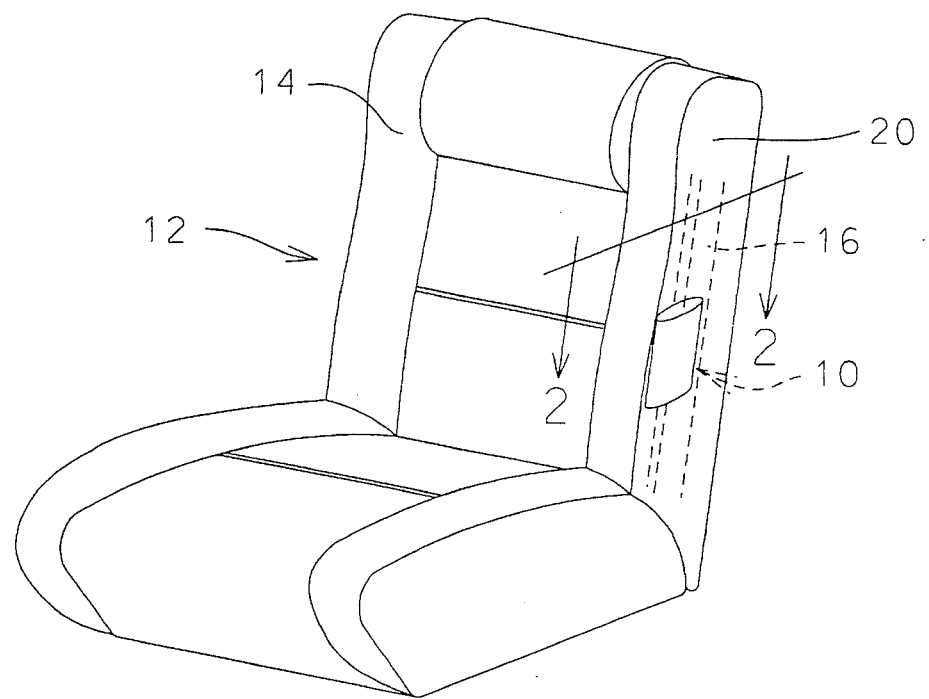
FIG. 1 is a pictorial view of a driver side front seat of a motor vehicle illustrating an internally mounted inflatable restraint module in accordance with the present invention in hidden lines.
Figure 2:
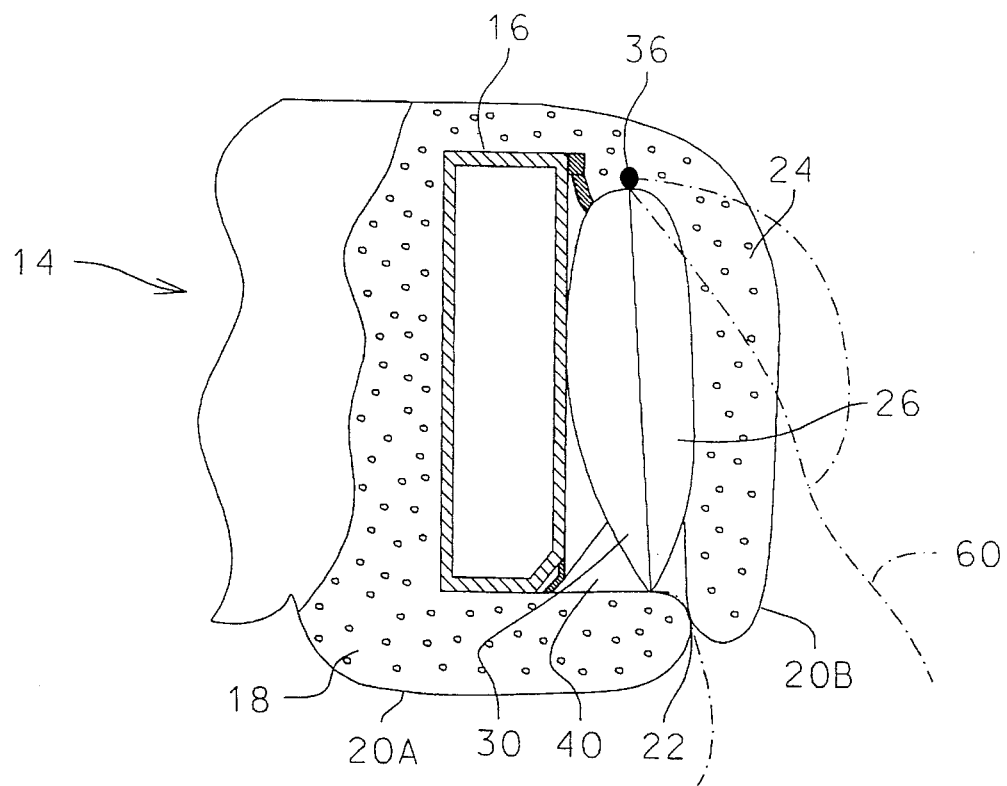
FIG. 2 is a cross-sectional view taken along line 2—2 of FIG. 1.

With reference to FIGS. 1 and 2, inflatable restraint module 10 is disposed within seat back 14 of motor vehicle seat 12. More particularly, inflatable restraint module 10 is secured to outboard seat back frame member 16 and surrounded by soft foam material 18 which is covered externally by fabric portions 20a, 20b. Fabric portions 20a, 20b are joined along tear seam 22 which fails upon pressure exerted by an inflating air cushion allowing fabric portions 20a, 20b to expose inflatable restraint module 10.

Referring now to FIGS. 2–5, inflatable restraint module housing 24 provides a enclosure for an air cushion assembly. Housing 24 is generally cylindrical in shape having a tapering elliptical cross-section and includes outboard half 26 and inboard half 30 coupled along a rearward edge by hinge 36. Housing 24 opens and closes in a clam shell-like fashion along deployment edge 38 defined by the edge of outboard half 24 and inboard half 30 opposite hinge 36.

Figure 3:
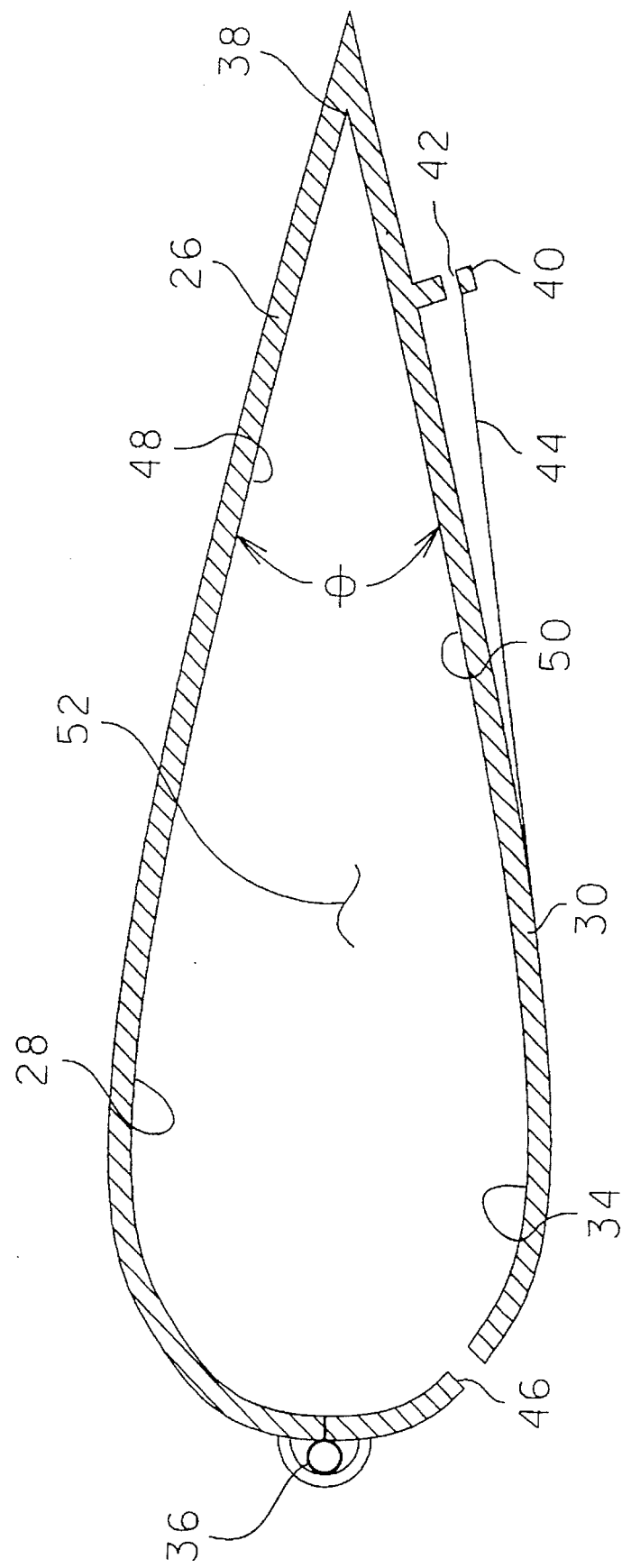
FIG. 3 is a cross-sectional view taken through the housing at an attachment slot, the air cushion assembly having been removed.

With reference now to FIG. 3, inner surface 28 of outboard half 26 and inner surface 34 of inboard half 30 intersect to form an acute angle (indicated by $\Theta$) at deployment edge 38 when housing 24 is in a closed condition, thereby providing means for focusing the energy generated by the inflating air cushion towards deployment edge 38 and away from hinge 36. For example, as illustrated in FIG. 3, inner surfaces 28 and 34 intersect to form an angle preferably in the range of 30° to 60°, even more preferably at approximately 45°.

However, as one skilled art would readily appreciate, a variety of inner surface configurations which intersect at less than 90° could be suitably employed provided that the energy generated by the inflating air cushion is focused towards deployment edge 38.

Outboard directing ramp 48 is formed in inner surface 28 of outboard half 26. Similarly, inboard directing ramp 50 is formed in inner surface 34 of inboard portion 30. Outboard and inboard directing ramps 48, 50 converge towards deployment edge 38 to define tapered interior chamber 52 giving housing 24 a tapering elliptical cross-section. Inboard directing ramp 50 extends past outboard directing ramp 48 at deployment edge 38 to provide a smooth transitioning edge of housing which expedites deployment of air cushion 60. Similarly, the end portions 54, 56 of outboard and inboard halves 26, 30 assist in deployment of air cushion 60 by focusing air cushion outwardly past deployment edge 38 and constraining deployment of air cushion 60 in the vertical direction.

Figure 4:
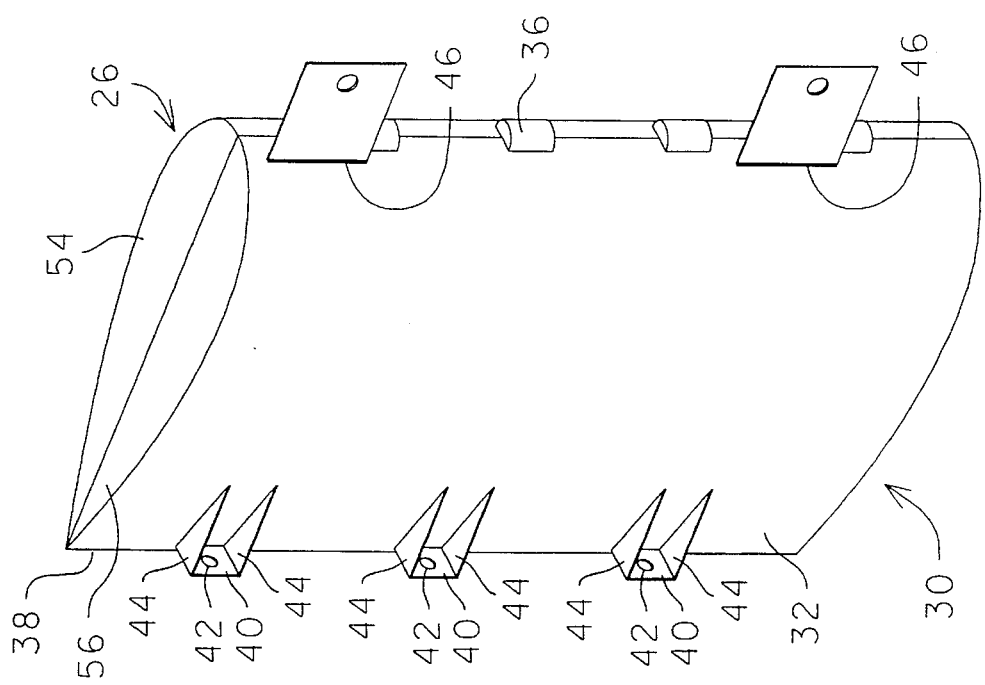
FIG. 4 is a perspective view of the present invention showing the inboard side of the housing.

With reference to FIG. 4, inboard half 30 further includes attachment flange 40 extending from outer surface 32 near the front portion of inboard half 30. Aperture 42 is formed through attachment flange 40 for receiving a threaded fastener which secures housing 24 to seat back frame member 16. Attachment flange 40 provides additional local rigidity to housing 24 along deployment edge 38 to prevent deformation thereof during air cushion deployment. A pair of ribs 44 are also formed in inboard half 30 extending from attachment flange 40 rearward to stiffen attachment flange 40 as well as inboard half 30. Mounting bracket tabs 68 extend through slots 46 formed in inboard half 30 and provide means for securing housing 24 to seat back frame member 16 adjacent hinge 36.

Figure 5:
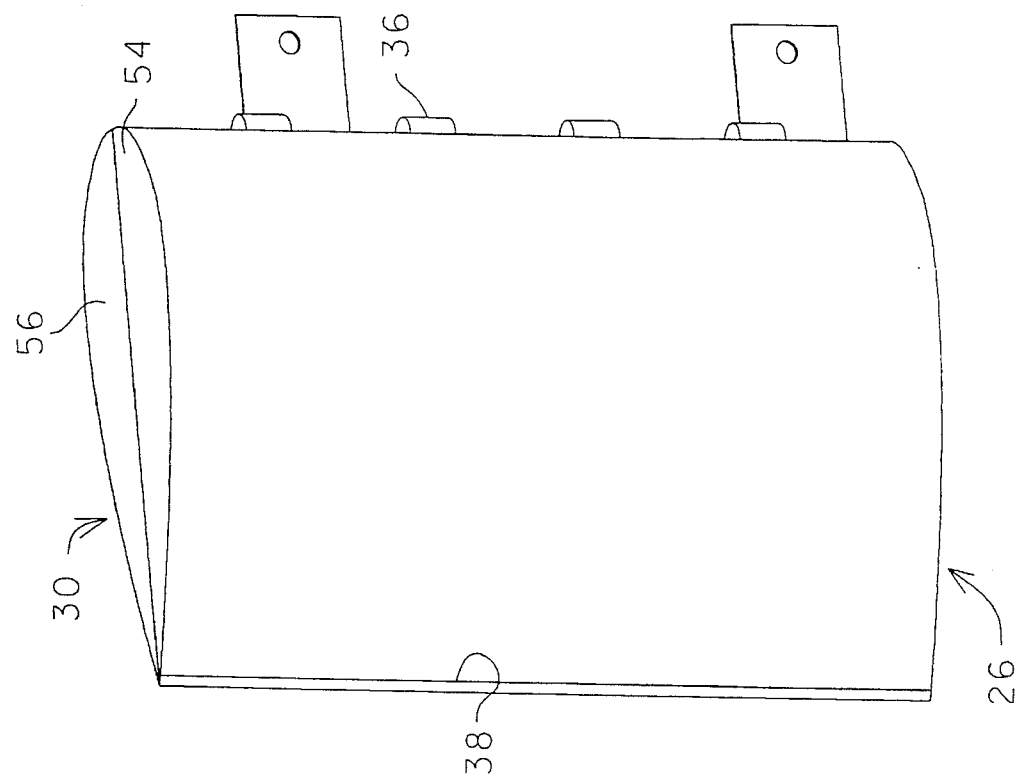
FIG. 5 is a perspective view of the present invention showing the outboard side of the housing.

Referring now to FIG. 5, outboard half 26 is substantially similar to inboard half 30, with the exception that it does not include any features for securing inflatable restraint module housing 24 to the seat back frame member 16. While housing 24 may be suitably manufactured from a variety of well-known techniques, housing 24 is preferably a molded thermoplastic part which enables the features heretofore described to be formed as a one-piece structure. More specifically, outboard half 26 and inboard half 30 may be formed in the unitary, mold in which hinge 36 couples each respective part. Furthermore, attachment flange 40 and ribs 44 may also be incorporated into the mold, thus providing a one-piece housing. Molded thermoplastic additionally possesses adequate rigidity to adequately react the energy generated during deployment of the air cushion and resisting substantial deformation of inboard and outboard halves 26, 30 while remaining sufficiently light in weight.

Figure 6:
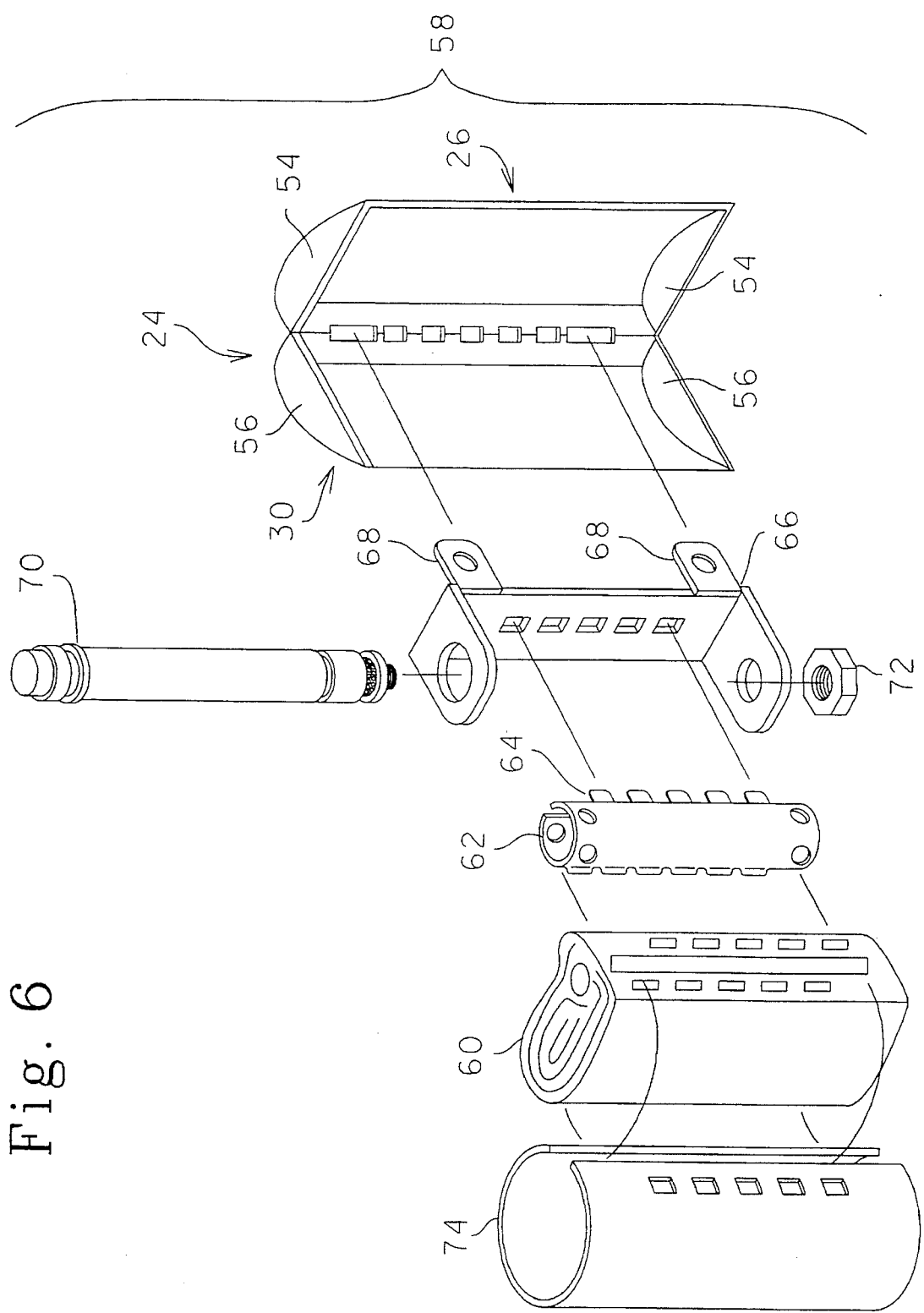
FIG. 6 is an exploded view of the present invention illustrating the housing, inflator assembly and air cushion.

Referring now to FIG. 6, air cushion assembly 58 of inflatable restraint module 10 are shown. Air cushion 60 can be formed of various materials conventionally used for air cushions, for example, polyester or nylon weaved materials which may be coated or uncoated to provide the desired inflation gas leakage characteristics. Retainer bracket 62 is disposed within air cushion 60 and defines a plenum for receiving inflator 70. TYVEK™ sheet 74 wraps around air cushion 60 and retainer bracket 62 for enabling air cushion 60 to be prepackaged in a folded condition. A series of perforations formed in sheet 74 cooperate with fingers 64 extending from retainer bracket 62 to keep air cushion 60 in its folded condition. Fingers 64 also engage mounting bracket 66 to secure retainer bracket 62 thereto. Inflator 70 is disposed within retainer bracket 62 and secured to mounting bracket 66 by retainer nut 72. Mounting bracket tabs 68 extend from mounting bracket 66 and through housing 24 as heretofore described for securing inflatable restraint module 10 to seat back frame member 16.

While a general description of the internal components of inflatable restraint module 10 has been provided herein, one skilled in the art should readily appreciate that various internal components could be incorporated into the present invention without deviating from the scope thereof. Further details of the presently preferred internal components of inflatable restraint module 10 is thoroughly disclosed in U.S. application Ser. No. 08/247,099 entitled "Side Air Bag Module With Improved Assembly Features" filed May 20, 1994 and U.S. Application Ser. No. 08/456,568 entitled "Simplified Side Impact Inflatable Restraint Module" filed Jun. 1, 1995 which are commonly owned by the assignee of the present invention and the disclosures of which are expressly incorporated by reference herein.

As previously discussed, the present invention ensures rapid emergence and proper direction and placement of air cushion 60 during deployment. In the deployment sequence, inflator 70 is initiated by an electrical signal and begins to produce gas which flows through the plenum created between inflator 70 and retainer bracket 62. Air cushion 60 begins to expand as gas flows out through holes incorporated into retainer bracket 64 and into folded air cushion 60. Sheet 74 is ruptured and air cushion 60 puts pressure on inner surfaces 28, 32 of housing 24. Air cushion 60 continues to expand, sliding against outboard and inboard directing ramps 48, 50 which modify the direction of the deploying bag, focusing the energy on the deployment edge 38. The energy of the expanding air cushion 60 rotates outboard half 26 away from inboard half 30 about hinge 36 to open housing 24 and deploy air cushion 60 therefrom.

In a preferred embodiment, inflatable restraint module 10 is mounted within seat 12 and covered by foam 18 and seat cover fabric 20. The momentum of deploying air cushion 60 is directed at tear seam 22 causing it to fail. Air cushion 60 passes into the vehicle interior between the outboard side of the occupant and the door side wall trim. When in this position, air cushion 60 continues to inflate to provide occupant protection.

In an alternate embodiment, the housing is not covered by foam or fabric, but rather is directly exposed to the vehicle interior. In this alternate embodiment, the outboard half becomes an integral part of the seat trim.

During operation, an air cushion deploys from the housing directly into the interior of the vehicle between the occupant and the door side wall. Positioning of the air cushion is facilitated by directing the energy of the air cushion as previously described using inboard and outboard directing ramps.

While the present invention has been described with particular reference to a side impact inflatable restraint module, one skilled in the art would readily recognize that the present invention may be employed in other inflatable restraint applications such as a passenger inflatable restraint module. In this application, instead of deploying the air cushion through the seat, the air cushion is deployed through the instrument panel. As in the side impact application, the outer surface of the housing could be either a visible surface or a hidden surface covered by the instrument panel upper pad.

The foregoing discussions discloses and describes exemplary embodiments of the present invention. One skilled in the art will readily recognize that from such discussion and from the accompanying drawings and claims, that various changes, modifications and variations can be made therein without departing from the spirit and true scope of the invention as defined in the following claims.

What is claimed:

1. An inflatable restraint housing for enclosing an air cushion assembly capable of deploying an air cushion into a vehicle interior, said housing comprising:

a first half;

a second half hingedly secured to said first half along a hinged edge, said first and second halves defining a tapered interior chamber which converges towards a deployment edge opposite said hinged edge; and a stiffening rib extending from said housing adjacent said deployment edge:

said first and second halves configured for enclosing the air cushion assembly in a closed condition such that said tapered interior chamber can focus the energy generated by the inflation of the air cushion towards said deployment edge causing said first half to rotate with respect to said second half to an open condition and allow the air cushion to be deployed therefrom, said tapered interior chamber further configured for directing the deployment of said air cushion into a vehicle interior.

2. The inflatable restraint housing of claim 1 wherein said tapered interior chamber is generally cylindrical having a tapering elliptical cross section.

3. The inflatable restraint housing of claim 1 wherein said housing further comprises a directing ramp formed on an inner surface thereof to define said tapered interior chamber.

4. The inflatable restraint housing of claim 3 wherein said directing ramp is formed on an inner surface of said first half and extends to said deployment edge to provide a smooth transition between said tapered interior chamber and said deployment edge.

5. The inflatable restraint housing of claim 1 wherein said housing further comprises a first directing ramp formed on an inner surface of said first half and a second directing ramp formed on an inner surface of said second half, said first and second directing ramps defining said tapered interior chamber.

6. The inflatable restraint housing of claim 1 wherein said stiffening rib provides a location for securing said inflatable restraint housing to a portion of the vehicle interior.

7. The inflatable restraint housing of claim 1 wherein said housing is a one-piece molded thermoplastic part.

8. An inflatable restraint housing for enclosing an air cushion assembly capable of deploying an air cushion into a vehicle interior, said housing comprising:

a first half having a first inner surface;

a second half having a second inner surface, said second half hingedly secured to said first half along a hinged edge to define an interior chamber;

said first and second inner surfaces intersecting to form an acute angle at a deployment edge opposite said hinged edge; and a stiffening rib extending from said housing adjacent said deployment edge:

said first and second halves configured for enclosing the air cushion assembly in a closed condition such that said interior chamber can focus the energy generated by the inflation of the air cushion towards said deployment edge causing said first half to rotate with respect to said second half to an open condition and allow the air cushion to be deployed therefrom, said interior chamber further configured for directing the deployment of said air cushion into a vehicle interior.

9. An inflatable restraint module for use in a vehicle comprising:

an air cushion assembly including an air cushion and an inflation gas source for inflating said air cushion, said air cushion being deployable from a folded condition to an inflated condition;

a housing including a first half, a second half hingedly secured to said first half along a hinged edge, said first and second halves defining a tapered interior chamber which converges towards a deployment edge opposite said hinged edge;

said housing enclosing said air cushion assembly in a closed condition such that said tapered interior chamber focuses the energy generated by the inflation of said air cushion towards said deployment edge causing said first half to rotate with respect to said second half to an open condition and allow said air cushion to be deployed therefrom, said tapered interior chamber further directing said air cushion into said inflated condition.

10. The inflatable restraint module of claim 9 wherein said tapered interior chamber is generally cylindrical having a tapering elliptical cross section.

11. The inflatable restraint module of claim 9 wherein said housing further comprises a directing ramp formed on an inner surface thereof to define said tapered interior chamber.

12. The inflatable restraint module of claim 11 wherein said directing ramp is formed on an inner surface of said first half and extends to said deployment edge to provide a smooth transition between said tapered interior chamber and said deployment edge.

13. The inflatable restraint module of claim 9 wherein said housing further comprises a first directing ramp formed on said first half and a second directing ramp formed on said second half, said first and second directing ramps defining said tapered interior chamber.

14. The inflatable restraint module of claim 9 wherein said housing further comprises a stiffening rib extending therefrom adjacent said deployment edge.

15. The inflatable restraint module of claim 14 wherein said stiffening rib provides a location for securing said housing to a portion of the vehicle interior.

16. The inflatable restraint module of claim 9 wherein said housing is a one-piece molded thermoplastic part.

17. The inflatable restraint module of claim 9 wherein said air cushion assembly further comprises:

a retainer bracket disposed within said air cushion and defining a plenum;

a mounting bracket coupled to said retaining bracket and having a mounting tab extending therefrom; and an inflator disposed within said plenum and secured to said mounting bracket.

18. The inflatable restraint module of claim 17 wherein said housing has a slot formed therein, said mounting tabs extending through said slot to secure said air cushion assembly to said housing and to provide a location to secure said inflatable restraint module to the vehicle.

19. An inflatable restraint module for use in a vehicle comprising:

an air cushion assembly including an air cushion and an inflation gas source for inflating said air cushion, said air cushion being deployable from a folded condition to an inflated condition;

a housing including a first half having a first inner surface, a second half having a second inner surface, said second half hingedly secured to said first half along a hinged edge to define an interior chamber;

said first and second inner surfaces intersecting to form an acute angle at a deployment edge opposite said hinged edge; and said first and second halves enclosing said air cushion assembly such that said interior chamber focuses the energy generated by the inflation of said air cushion towards said deployment edge causing said first half to rotate with respect to said second half to an open condition and allow the air cushion to be deployed therefrom, said interior chamber further directing the deployment of said air cushion into said inflated condition.

* * * * *